W. A. VAN BERKEL.
MEAT CLAMP FOR SLICING MACHINES.
APPLICATION FILED MAY 31, 1913.
1,179,980.
Patented Apr. 18, 1916.
2 SHEETS—SHEET 2.
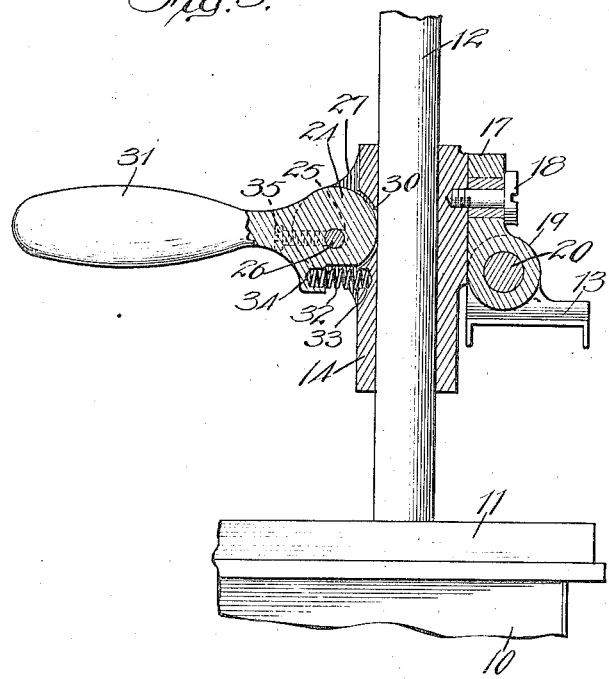
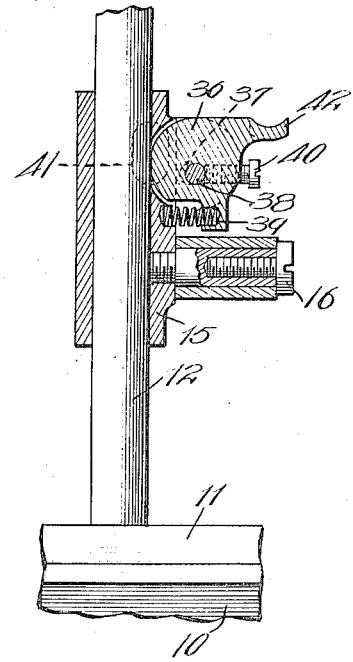
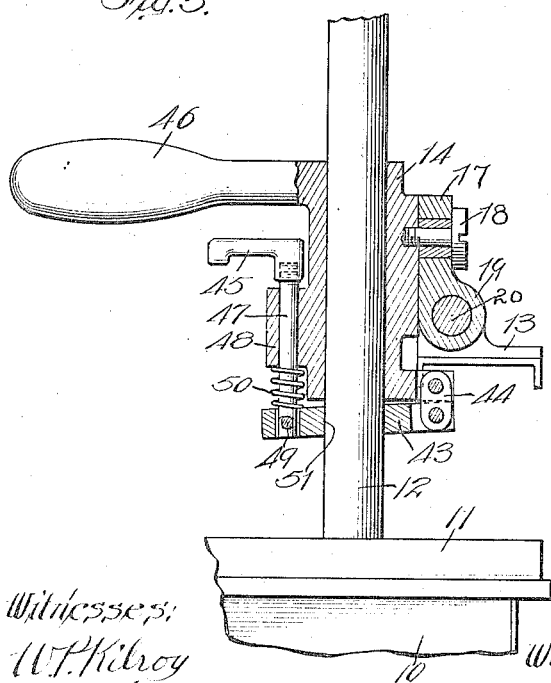
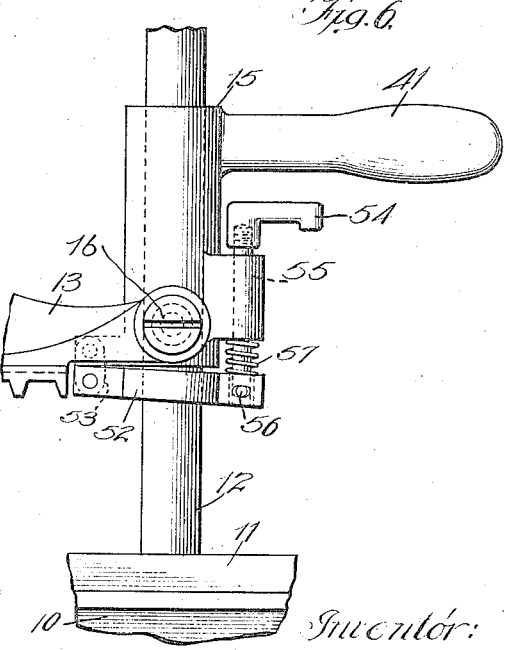
Witnesses:
W. F. Kilroy
Harold L. Barrett
Inventor:
Wilhelmus Adrianus Van Berkel
By J. F. Jochum Jr.
Atty.

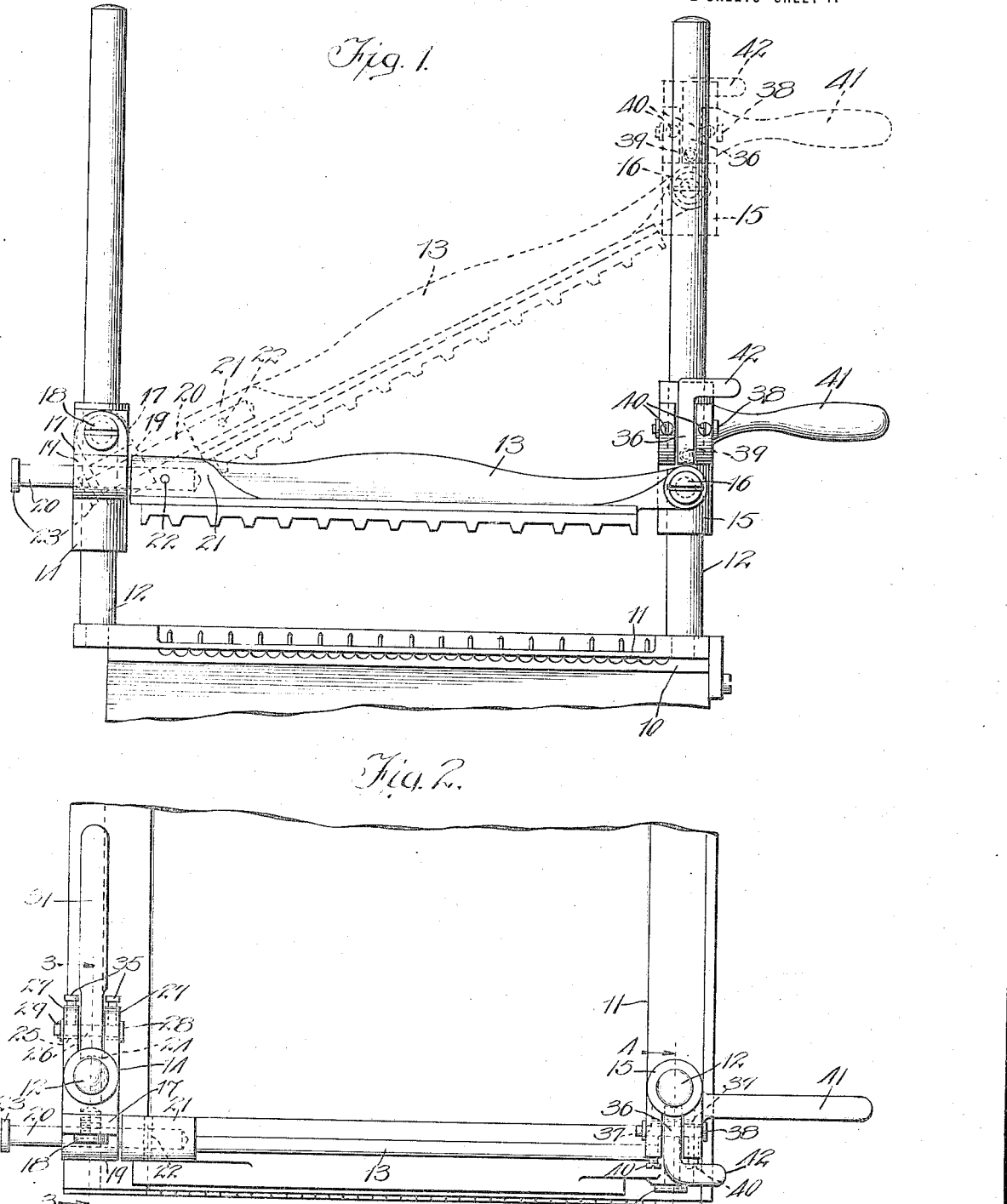

UNITED STATES PATENT OFFICE.

WILHELMUS ADRIANUS van BERKEL, OF ROTTERDAM, NETHERLANDS, ASSIGNOR TO U. S. SLICING MACHINE COMPANY, OF CHICAGO, ILLINOIS, A CORPORATION OF ILLINOIS.

MEAT-CLAMP FOR SLICING-MACHINES.

1,179,980.  Specification of Letters Patent.  Patented Apr. 18, 1916.

Application filed May 31, 1913. Serial No. 770,849.

*To all whom it may concern:*

Be it known that I, WILHELMUS ADRIANUS VAN BERKEL, a subject of the Ruler of the Netherlands, residing at Rotterdam, Netherlands, have invented certain new and useful Improvements in Meat-Clamps for Slicing-Machines, of which the following is a specification.

This invention relates in general to meat slicing machines but more particularly to the clamp for holding the meat while the latter is being cut, and one of the objects of the invention is to provide an improved, simple, durable, and effective meat clamp which may be readily and quickly released and adjusted to any desired extent and as readily locked or secured in any of its adjusted positions.

A further object is to provide an improved device of this class in which both ends of the meat clamping element may be readily adjusted, or one end adjusted with relation to the other, and the said other end anchored or secured against adjustment, thereby rendering it necessary to adjust only one end of the meat clamping element, to release the meat, after it has been once clamped.

To the attainment of these ends and the accomplishment of other new and useful objects as will appear the invention consists in the features of novelty in substantially the construction, combination and arrangement of the several parts hereinafter more fully described and claimed and shown in the accompanying drawings exemplifying this invention and in which:

Figure 1 is an elevation of a portion of a slicing machine meat table having a clamp applied thereto, constructed in accordance with the principles of this invention. Fig. 2 is a top plan view of the parts shown in Fig. 1. Fig. 3 is a detail sectional view on line 3—3, Fig. 2. Fig. 4 is a detail sectional view on line 4—4, Fig. 2. Fig. 5 is a view similar to Fig. 3 of a modified form of fastening device for one end of the meat clamping element. Fig. 6 is a side elevation of a fastening device similar to that shown in Fig. 5 for the other end of the meat clamping element.

Referring more particularly to the drawings and in the present exemplification of this invention, the numeral 10 designates generally the meat table upon which is mounted the usual sliding meat support 11. Connected with and projecting above the support 11 are uprights or standards 12 which extend for any desired distance above the support and are arranged adjacent the sides thereof.

The meat clamping element 13 extends across the space between the uprights 12 and is adapted to be adjusted upwardly and downwardly upon the uprights and in order to accomplish this adjustment sleeves 14 and 15 are provided, one of which loosely surrounds each of the uprights 12. These sleeves are preferably of some length so as to have extended bearings against the uprights, and one end of the clamping element 13 is pivotally connected as at 16 with the sleeve 15.

A swinging member 17 is pivotally supported by the other sleeve 14 by means of a suitable pivot pin 18 and the pivot of the member 17 is preferably arranged transversely with respect to the upright 12. This member 17 is provided with a bearing portion 19 into which a stud 20 projects and which stud is secured to the element 13 in any suitable manner preferably by one end of the stud entering a suitable recess in the element, as at 21 and being fastened against removal by means of a suitable fastening device 22. The stud 20 projects for some distance beyond the end of the element 13 so as to have an extended sliding engagement with the bearing 19 of the member 17, and the free end of the stud 20 is provided with a head or shoulder 23 which prevents disengagement of the stud from the bearing.

When the clamping element is in the position shown in Fig. 1 it will be noted that the headed end of the stud 20 projects for some distance beyond the bearing 19 of the member 17 and the upright 12, but when it is desired to release the clamping element and move it into the position shown in dotted lines in Fig. 1, which may be accomplished by sliding the sleeve 15 upwardly upon the standard 12, the stud 20 will slide through the bearing 19, and at the same time the member 17 which carries the bearing 19 will be moved about its pivot 18. When the clamping element 13 is lowered from the dotted line position in Fig. 1, the member 17 will swing in the opposite direction about its pivot, and the stud 20 will move through the bearing 19 in the opposite direction.

In order to anchor the sleeves 14 and 15 against adjustment upon the respective uprights 12, suitable devices are provided which will now be described.

As shown in Fig. 3 of the drawings, the fastening device for the sleeve 14 is in the form of a cam 24 through which a pin 26 passes, and this pin has bearings in spaced projecting portions 27 of the sleeve, and which portions are provided with slots 25, the pin being held against displacement in any suitable manner preferably by means of a head 28 on one end thereof, and a fastening pin 29 passing through the opposite end thereof. The sleeve 14 adjacent these projections 27 is provided with a slotted portion 30 so that when the cam 24 is mounted upon the pin 26, a portion of the cam will project through the slot 30 so as to engage the upright 12. A handle 31 is provided for operating the cam 24, or moving it in one direction about its pivot, and an elastic member 32, preferably in the form of a coil spring is provided for moving the cam about its pivot in the opposite direction. This elastic member 32 has a bearing 33 upon the sleeve 14 and also upon a projecting portion 34 of the cam 24.

In order to compensate for the wear between the cam and the upright 12, adjusting devices 35 in the form of screws are provided which have bearing in a portion of the sleeves 14 and engage the pin 26 and are arranged to adjust the cam bodily toward or away from the upright 12, which adjustment is permitted by means of the slots 25.

The locking device for the sleeve 15, as shown in Fig. 4 is also in the form of a cam 36 the bearing of which is provided with slots 37 similar to the slots 25, and the cam is mounted for pivotal movement upon a pin 38 similar to the pin 26, and an elastic member 39 similar to the elastic member 32 is provided for moving the cam 36 about its pivot in one direction. Adjusting screws 40 similar to the screws 35 are provided for the same purpose as the screws 35.

The handle 41 is connected with the sleeve 15 and a handle 42 is connected with the cam 36, the latter handle being arranged in such a position with relation to the handle 41, that when the operator grasps the handle 41, he may also grasp the handle 42 to operate the latter and shift the cam 36 against the stress of the elastic member 39 and thereby unlock the sleeve 15, which will permit the sleeve to be moved upon the upright 12 by means of the handle 41. After the sleeve has been adjusted to the desired position, all that is necessary is to release the handle 42 and the sleeve 15 will, by means of elastic member 39 and cam 36 be automatically locked in its adjusted position, thereby retaining that end of the meat clamping element 13 in its adjusted position so that it will not fall down upon the hands of the operator when the operator is adjusting a piece of meat upon the support 11.

In order to release the sleeve 14 all that is necessary is for the operator to grasp the handle 31 and swing the cam 24 about its pivot to release the sleeve, which may be accomplished by depressing the handle 31, and then by exerting an upward movement of the handle 31 while holding it depressed, the operator may slide the sleeve 14 upon the upright 12. When the sleeve has reached the predetermined position all that is necessary to lock it is to release the handle 31, at which time the elastic member 32 will move the cam 24 into such a position that it will grip the upright 12.

The locking device for the sleeve 14, as shown in Fig. 5, comprises a collar 43 which is preferably arranged beneath the sleeve and encompasses the upright 12. This collar is connected to the sleeve 14 for pivotal movement with respect thereto by means of a link 44 having pivotal connection with each. A handle 45 is arranged beneath a handle 46 which latter is connected with the sleeve 14 so that when the handle 46 is grasped, the handle 45 may be also grasped, and this handle 45 is provided with a stem 47 sliding in a suitable bearing 48 and having a pin and slot connection 49 with the collar 43. An elastic member 50 is disposed between the sleeve 14 and the collar 43, and preferably surrounds the stem 47. This elastic member 50 tends normally to move the collar 43 in a direction, with respect to the sleeve 14 so as to exert a frictional gripping upon the upright 12 to lock the sleeve against adjustment. To release the sleeve the handle 46 may be grasped and at the same time the handle 45 may be grasped to shift the stem 47 in a direction to move the collar 43 against the stress of the elastic member 50, and to position the aperture 51 in the collar 43 so that the collar will release this upright 12 and the aperture will be in such a position that the collar and the sleeve may be freely moved upon the upright 12 to any desired position. After adjustment the handle 45 may be released at which time the elastic member 50 will exert its stress upon the collar 43 and cause it to grip the standard or upright 12.

In Fig. 6 a similar locking device is shown and comprises a collar 52 which encompasses the upright 12 and is connected by means of a link 53 with the sleeve 15. A handle 54 having a stem 55 which is connected by means of a pin and slot connection 56 with the collar 52 is arranged beneath the handle 41 which is connected with the sleeve 15 and an elastic member 57 similar to the elastic member 50 is provided for controlling the movement of the collar 52 in one direction.

It is thought that the operation of this device will be fully understood from the above description but briefly stated it is as follows: The sleeve 14 may be first adjusted upon its upright 12 to any desired position with respect to this support 11 regardless of the position of the sleeve 15 upon its standard, and when the sleeve 14 is anchored to its upright, and the meat is placed upon the support 11, the sleeve 15 together with its end of the clamping element 13 is lowered, until the clamping element engages the meat. After the sleeve 15 has been forced downwardly to cause the meat to be firmly gripped, the locking device of the sleeve 15 is released and this sleeve will be automatically locked in position. After the slicing operation or when it is desired to remove the meat to place another piece of meat upon the support it is not necessary to release the sleeve 14 and the end of the clamp adjacent to that sleeve, but by releasing the sleeve 15, the end of the clamp adjacent that sleeve may be elevated and when elevated to a predetermined position, the locking device for the sleeve 15, when released, will automatically secure the sleeve and that end of the clamp which is connected therewith against return movement and thereby hold the clamping element against falling down upon the hands of the operator, while at the same time the element will be held out of the way to permit the meat to be adjusted. During the raising and lowering of the sleeve 15 and the adjacent end of the clamp, the bearing member 17 will swing about its pivot 18, and the stud or trunnion 20 by means of which that end of the clamp is connected with the sleeve 14, will slide through the bearing 19 at the same time that the member 17 is moving about its pivot. It will also be manifest, that by the action of the joints 17, 18, 19 and the pivot 16, the clamping bar 13 when lowered on the right hand end, the left hand end being anchored, there will be a tendency of the bar 13 to roll the article over the support 10 and thereby force the pins 11 into the article, thereby insuring a better gripping of the article and a positive and firm hold while cutting.

While in the present exemplification of this invention, the preferred forms of construction have been shown and described, it is to be understood that many changes may be made in the details of construction and in the combination and arrangement of the several parts without departing from the spirit of this invention.

What is claimed as new is:—

1. A device of the class described embodying a clamping element, spaced uprights, means movable upon the uprights and coöperating with the ends of said element for supporting the element for bodily adjustment and with which means the respective ends of the element have pivotal connection, and a locking device for securing each end of the element against bodily adjustment.

2. A device of the class described, embodying a clamping element, spaced uprights, means movable upon the uprights for supporting the ends of the element for bodily adjustment, means for anchoring one end of the element against such adjustment, and means whereby the bodily adjustment of the other end will impart another and different movement to the said anchored end of the element.

3. A device of the class described, embodying a clamping element, spaced uprights, means movable upon the uprights and supporting the ends of the element for bodily adjustment, means for anchoring one end of the element against such adjustment, means whereby the bodily adjustment of the other end will impart another and different movement to the said anchored end of the element, to impart to the article when the element engages the article, a slight rolling movement upon the support, and means for securing the said other end of the element in any of its adjusted positions.

4. A device of the class described embodying a clamping element, bodily adjustable supports individual to the ends of the element and with which supports the respective adjacent ends of the element have connection for swinging movement with respect thereto, and means whereby the bodily adjustment of one of the supports and the adjacent end of the element will impart to the other end of the element another and different movement thereto with respect to its support.

5. A device of the class described embodying a clamping element, supports spaced longitudinally of the element and with which the element has pivotal connection, uprights upon which the supports are movable, and fastening means coöperating with the supports and uprights for securing the supports in their adjusted positions.

6. A device of the class described embodying a clamping element, supports spaced longitudinally of the element and with which the element has pivotal connection, uprights upon which the supports are movable, means for individually securing the supports against adjustment, and means whereby one of the supports may be adjusted upon its upright while the other support is secured against adjustment.

7. A device of the class described, embodying a clamping element, supports spaced longitudinally of the element and with which supports the element has pivotal connection, uprights upon which the supports are movable, and means whereby an endwise shifting movement will be imparted to the said element, when one of the supports is adjusted and the other support is retained against adjustment upon their respective uprights.

8. A device of the class described, embodying adjustably mounted supports, a meat clamping element, means pivotally connecting one end of the element with one of the supports, and means connecting the other end of the element with the other support and for a swinging and a sliding movement with respect thereto.

9. A device of the class described embodying adjustably mounted supports, a meat clamping element, means pivotally connecting the element with one of the supports, and means connecting the other end of the element with the other support and for two different movements with respect to the support.

10. A device of the class described embodying adjustably mounted supports, a clamping element, means pivotally connecting one end of the element with one of the supports, and a supplemental support pivotally connected with the other support and with which supplemental support the other end of the element has a sliding engagement.

11. A device of the class described embodying adjustably mounted supports, a clamping element pivotally connected with one of the supports, a supplemental support pivotally connected with the other support, and a bearing carried with the supplemental support, a portion of the said element sliding in the bearing.

In testimony whereof I have signed my name to this specification, in the presence of two subscribing witnesses, on this fifteenth day of May A. D. 1913.

WILHELMUS ADRIANUS van BERKEL.

Witnesses:
PIETER C. DE GROOT,
CORNELIS F. M. VAN BERKEL.